United States Patent
Lehmann et al.

(10) Patent No.: US 11,401,981 B2
(45) Date of Patent: Aug. 2, 2022

(54) SWITCHING UNIT FOR COOLING OIL, AND HYBRID MODULE HAVING A SWITCHING UNIT

(71) Applicant: SCHAEFFLER TECHNOLOGIES AG & CO. KG, Herzogenaurach (DE)

(72) Inventors: Steffen Lehmann, Ettlingen (DE); Marc Helfer, Ottrott (FR); Dirk Hofstetter, Durmersheim (DE)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 6 days.

(21) Appl. No.: 16/612,482

(22) PCT Filed: Apr. 12, 2018

(86) PCT No.: PCT/DE2018/100344
§ 371 (c)(1),
(2) Date: Nov. 11, 2019

(87) PCT Pub. No.: WO2018/206039
PCT Pub. Date: Nov. 15, 2018

(65) Prior Publication Data
US 2020/0096053 A1 Mar. 26, 2020

(30) Foreign Application Priority Data

May 11, 2017 (DE) .......................... 102017110193.4
Jun. 22, 2017 (DE) .......................... 102017113839.0

(51) Int. Cl.
*F16D 13/72* (2006.01)
*B60K 6/387* (2007.10)
(Continued)

(52) U.S. Cl.
CPC .............. *F16D 13/72* (2013.01); *B60K 6/387* (2013.01); *F16D 13/385* (2013.01); *F16D 13/52* (2013.01);
(Continued)

(58) Field of Classification Search
CPC ........ F16D 13/72; F16D 13/74; F16D 13/385; F16D 13/52; F16D 21/06; F16D 25/123;
(Continued)

(56) References Cited

U.S. PATENT DOCUMENTS 4,270,647 A * 6/1981 Leber ...................... F16D 13/74
192/113.35
6,715,597 B1 * 4/2004 Buchanan ............. F16D 25/123
192/113.35
(Continued)

FOREIGN PATENT DOCUMENTS

CN 1815051 A 8/2006
CN 102066798 A 5/2011
(Continued)

OTHER PUBLICATIONS

Machine language translation of DE102011013234.*

*Primary Examiner* — Tinh Dang

(57) ABSTRACT

A switching unit for a hybrid module for a drivetrain of a hybrid vehicle is provided. A first clutch is selectively closable to transmit torque from a drive shaft to a first output shaft. A second clutch is selectively closable to transmit torque from the drive shaft to a second output shaft. A plurality of ducts include a cooling oil supply duct, a first cooling oil duct configured to supply cooling oil to the first clutch, and a second cooling oil duct configured to supply cooling oil to the second duct. A switching unit selectively supplies cooling oil to the first and second clutches via the first and second cooling oil ducts, respectively, wherein the switching unit includes a slide having an aperture extending (Continued)

therethrough, and the slide is configured to move to alternatively fluidly the coiling oil supply duct with the first or second cooling oil ducts.

15 Claims, 1 Drawing Sheet

(51) Int. Cl.
*F16D 13/38* (2006.01)
*F16D 13/74* (2006.01)
*F16D 25/12* (2006.01)
*F16D 21/06* (2006.01)
*F16D 13/52* (2006.01)

(52) U.S. Cl.
CPC ............ *F16D 13/74* (2013.01); *F16D 21/06* (2013.01); *F16D 25/123* (2013.01); *B60Y 2200/92* (2013.01); *B60Y 2400/4244* (2013.01); *F16D 2021/0661* (2013.01)

(58) Field of Classification Search
CPC ............ F16D 2021/0661; F16D 25/10; F16D 2300/0214; B60K 6/387
See application file for complete search history.

(56) References Cited

U.S. PATENT DOCUMENTS

| 2008/0108468 | A1 | 5/2008 | Iwasaki et al. |
| 2009/0008212 | A1* | 1/2009 | Combes ................ B60K 6/48 192/113.34 |
| 2011/0042177 | A1* | 2/2011 | Bauer ................ F16D 48/0206 192/85.61 |
| 2011/0132710 | A1* | 6/2011 | Schenck ............... F16D 25/123 192/3.33 |
| 2014/0169994 | A1* | 6/2014 | Schuller ............... F16H 61/688 417/410.1 |
| 2014/0291101 | A1* | 10/2014 | Schuller ............. F16H 61/0206 192/48.601 |

FOREIGN PATENT DOCUMENTS

| CN | 103518081 A | 1/2014 |
| CN | 105793596 A | 7/2016 |
| DE | 102011013234 A1 | 9/2012 |
| DE | 102011081006 A1 | 2/2013 |
| DE | 102014223033 A1 | 6/2015 |
| DE | 102016202656 A1 | 9/2016 |
| DE | 112015000947 T5 | 11/2016 |
| EP | 2998602 A1 | 3/2016 |

* cited by examiner

SWITCHING UNIT FOR COOLING OIL, AND HYBRID MODULE HAVING A SWITCHING UNIT

CROSS-REFERENCE TO RELATED APPLICATIONS

This application is the U.S. National Phase of PCT/DE2018/100344 filed Apr. 12, 2018, which claims priority to DE 10 2017 113 839.0 filed Jun. 22, 2017, and DE 10 2017 110 193.4 filed May 11, 2017, the entire disclosures of which are incorporated by reference herein.

TECHNICAL FIELD

This disclosure relates to a switching unit for supplying cooling oil to two (component) clutches, for example of a double clutch, which are selectively closable in order to transmit torque from a common drive shaft either to a first output shaft or to a second output shaft. In other words that, at all times, only one of the two clutches is closed, that is to say transmits torque, and the other one of the two clutches is open. The disclosure furthermore relates to a hybrid module for a drivetrain of a motor vehicle, in particular having a P1 hybrid arrangement, that is to say a hybrid arrangement in which the electric machine is fastened to the crankshaft of the internal combustion engine, and having two (component) clutches and such a switching unit.

BACKGROUND

Clutch devices having cooling oil switching units are already known from the prior art. For example, DE 10 2016 202 656 A1 discloses a clutch device having: first and second friction elements, which are mounted so as to be rotatable about an axis of rotation; a hydraulic actuation device for pressing the friction elements against one another axially; wherein the actuation device comprises a hydraulic working space with a first piston which acts axially on one of the friction elements; a valve for controlling a flow of fluid to the friction elements if the friction elements are pressed against one another, a second piston for actuating the valve, wherein the second piston is configured to open the valve if a pressure in a hydraulic supply line to the hydraulic working space increases, wherein the second piston is configured to close off a fluidic connection between the hydraulic supply line and the hydraulic working space while the valve is closed.

However, the prior art may have a disadvantage that, if such a cooling oil device is installed in a double clutch, the thermal cooling of the clutch is not sufficient if both component clutches are allocated the same (half the) quantity of cooling oil. It would therefore be necessary to increase the quantity of cooling oil considerably. Such cooling oil devices are therefore not able to be applied for conventional double clutches according to the prior art.

SUMMARY

It is therefore an object of the disclosure to avoid, or at least to reduce, the disadvantages from the prior art. In particular, the intention to develop a cooling oil distribution system which is able to be applied for a double clutch and is improved. In particular, embodiments of the disclosure is to develop a requirement-based cooling oil distribution system for a hybrid module having a double clutch, which requires particularly little cooling oil.

An object of the disclosure is achieved according to the disclosure with a generic device in that the switching unit has a slide and fluid ducts which are operatively connected thereto and which are placed in an operative relationship with one another such that the switching unit supplies cooling oil to a selected clutch in a manner dependent on which of the two clutches is connected in a torque-transmitting manner to the first output shaft or to the second output shaft. In other words that the switching unit for the cooling fluid distribution system distributes a cooling fluid between the two clutches in a manner dependent on an open/closed state of the two clutches.

This has the advantage that only that clutch which is respectively, actuated, that is to say closed, is cooled or is able to be provided to a greater extent with cooling fluid or cooling oil. In this way, it is possible to achieve an improved cooling result for the double clutch with a smaller quantity of cooling oil. It is thus also possible for efficient cooling to be realized with a smaller quantity of cooling oil, which results in the clutches being able to be subjected to greater thermal loading or lower pump losses occurring.

Advantageous embodiments will be claimed in the dependent claims and will be discussed in more detail below.

It is moreover expedient if the switching unit is designed such that it supplies cooling oil to the clutch which is connected in a torque-transmitting manner to the first output shaft or to the second output shaft. In other words that it supplies cooling oil to a first clutch if the first clutch is closed, and that it supplies cooling oil to a second clutch if the second clutch is closed. Conversely, this also means that the switching unit does not supply any cooling oil to a first clutch if the first clutch is open, and that it does not supply any cooling oil to the second clutch if the second clutch is open. In this way, the cooling oil distribution is therefore adapted to the cooling oil requirement such that, at all times, only that clutch which transmits torque, that is to say is in a state of frictional engagement, has to be cooled. If a clutch is open, there is no frictional engagement between the two clutch parts, with the result that no frictional heat is generated.

It is also advantageous if the slide is mounted and controllable such that, in a manner dependent on the supply of hydraulic medium/actuation oil used for the actuation of the respective clutch, said slide is forcibly displaced such that it selectively opens up a supply of cooling oil to the actuated, that is to say closed, clutch. The actuation of the clutch is thus hydraulically coupled to the control of the requirement-based oil distribution, with the result that no additional control is necessary for optimally distributing the cooling oil to the actuated clutch.

It is furthermore advantageous if the switching unit is designed such that the slide is moved by way of a first actuation oil pressure for actuating a first clutch of the two clutches, or by way of a second actuation oil pressure for actuating a second clutch of the two clutches, such that the cooling oil is supplied to the first clutch or to the second clutch. The switching unit is therefore hydraulically connected to the ducts for the actuation oil pressure for actuating the clutch, such that the forced displacement of the slide of the switching unit is realized. The fact that no additional control system has to be used means that the susceptibility to errors is reduced too, since, without an actuation oil pressure, it is also the case that the clutch does not function, that is to say, with actuation oil pressure present, it is also the case that the switching unit for the cooling oil functions.

A favorable exemplary embodiment is distinguished in that the switching unit has a defined leakage such that a small quantity of cooling oil is conducted to the two clutches in each switching position of the clutches. In this way, even with an open clutch, a reduced residual quantity of cooling oil flows to the open clutch such that, inter alia, the bearing points situated there are sufficiently cooled.

It is additionally advantageous if a duct for delivering the cooling oil is fluidically separated from a duct for delivering the actuation oil. In this way, a situation in which a leak in one of the ducts has an effect on the functional capability of the other one of the ducts is ruled out. Also in this way, a situation in which the cooling oil is able to mix with the actuation oil is ruled out.

It is also expedient if the slide/piston slide is displaceable into a first switching position, in which cooling oil is conducted to the first clutch and the second clutch, is fluidically separated from the coolant stream, apart from a small leakage. The slide is therefore designed such that, if for example the first clutch is actuated, that is to say is activated, the slide is moved such that a large part of the quantity of cooling oil flows into the distributor ducts provided for the first clutch. In this case, the movement of the slide is effected by the application of the actuation oil pressure for the first clutch.

It is furthermore advantageous if the slide is displaceable into a second switching position, in which cooling oil is conducted to the second clutch and the first clutch, is fluidically separated from the coolant stream, apart from a small leakage. The slide is therefore in the first switching position if the first clutch is subjected to actuation pressure, that is to say is closed, and in the second position if the second clutch is subjected to actuation oil pressure, that is to say is closed. This applies to a clutch which is designed as a normally open clutch.

An object of the disclosure is furthermore achieved in that use is made of a hybrid module for a drivetrain of the motor vehicle, having two component clutches and a switching unit according to embodiments of this disclosure.

Here, it is possible for the clutches to be designed as normally open clutches or as normally closed clutches. If the clutches are designed as normally open clutches, the cooling oil stream is directed to the first clutch if actuation oil is directed to the first clutch. If the clutches are designed as a normally closed clutch, the cooling oil is directed to the first clutch if the second clutch is subjected to actuation oil pressure, since the application of actuation oil pressure results in the second clutch being opened.

In other words, the disclosure relates to a switching unit for improving the cooling fluid distribution in a hybrid module. In this case, the hybrid module has at least two fluid- or oil-cooled clutches for which the cooling fluid or cooling oil is distributed to a greater extent to one clutch or to the other clutch, which in each case has been/is actuated, that is to say has been/is closed. The cooling fluid is distributed via a control piston/slide/piston slide, which is forcibly moved by way of the actuation fluid pressure applied for closing the respective clutch. In this case, the clutches may be clutches which are open in a rest position (normally open) and/or closed in a rest position (normally closed).

In such a hybrid module, the two oil-cooled clutches are present, wherein, for actuating/closing one of the two component clutches via an actuator or a pump, actuation oil pressure is applied to one component clutch or to the other component clutch. For cooling the clutches, cooling oil is supplied via a separate duct to one component clutch or to the other component clutch. Here, the pressurized oil for the actuation and the cooling oil can be passed on via ducts of an oil distributor unit. Since, in the case of uniform distribution of the cooling oil in the clutches, each component clutch would receive only half of the quantity of cooling oil, a thermally unfavorable state occurs, since in each case only one of the two clutches introduces friction energy, specifically the clutch which transmits torque.

A slide which can be subjected at both sides to the actuation oil pressure for the first clutch or the second clutch is integrated in the oil distributor unit/switching unit of the clutch. When the first clutch is closed, the slide is moved, by way of the actuation oil pressure for the first clutch, such that a large part of the quantity of cooling oil flows into the distributor ducts provided for the first clutch. By way of a defined leakage, it can be ensured that a reduced residual quantity still flows in the direction of the second clutch and of bearing points, and of other components, situated there. If the second clutch is then activated, the slide is moved such that a large part of the quantity of cooling oil flows to the distributor ducts provided for the second clutch. Consequently, even with a relatively small quantity of cooling oil, efficient cooling is achieved, which results in clutches which are able to be subjected to greater thermal loading, or to lower pump losses.

BRIEF DESCRIPTION OF THE DRAWINGS

Embodiments of this disclosure will be discussed below with the aid of figures, in which.

The figures are merely of a schematic nature and serve exclusively for the understanding of the disclosure. The same elements are denoted by the same reference signs.

DETAILED DESCRIPTION

Figure 1:
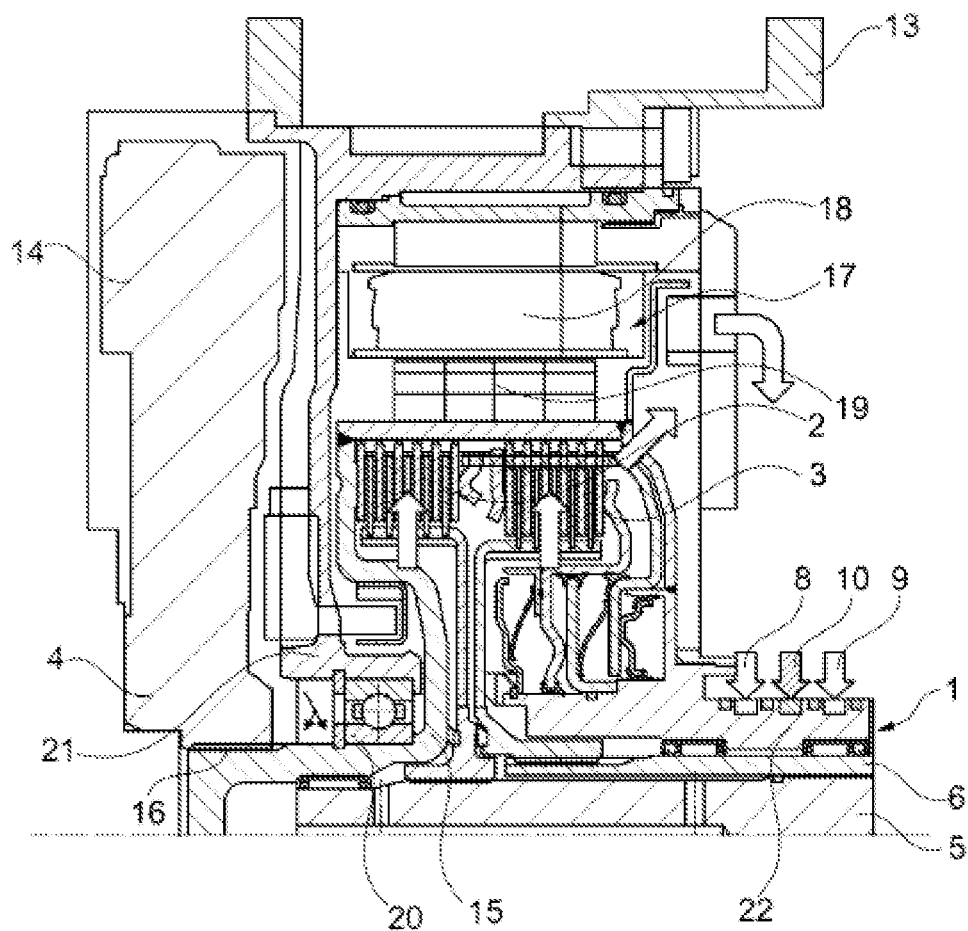
FIG. 1 shows a cross-sectional view of a hybrid module according to an embodiment with a switching unit.

FIG. 1 shows a switching unit 1 for supplying cooling oil to a first clutch 2 and to a second clutch 3, which clutches are selectively closable in order to transmit torque from a common drive shaft 4 either to a first output shaft 5 or to a second output shaft 6. Here, the first clutch 2 can connect the drive shaft 4 to the first output shaft 5 in a torque-transmitting manner, and the second clutch 3 can connect the drive shaft 4 to the second output shaft 6.

The switching unit 1 has a slide 7 and fluid ducts 8, 9, 10, 11, 12 which are operatively coupled thereto and which are placed in an operative relationship with one another such that the switching unit 1 supplies cooling oil to a selected clutch 2, 3 in a manner dependent on which of the two clutches 2, 3 is connected in a torque-transmitting manner to the first output shaft 5 or the second output shaft 6.

The two clutches 2, 3 are part of a hybrid module 13. In the hybrid module 13, a torsional vibration damper 14 is fastened to a crankshaft, serving as the drive shaft 4, such that an engine torque is transmitted to a rotor unit 15 of the hybrid module 13 via a spline-type toothing 16. The hybrid module 13 contains an electric machine 17, which has a stator 18 and a rotor 19 arranged concentrically therewith. The rotor 19 is fixed in a rotationally conjoint manner on the rotor unit 15. Two clutches 2, 3 are integrated within said rotor unit 15, wherein the clutches 2, 3 are oil-cooled. The rotor unit 15 is mounted via a first rolling bearing 20 in a housing 21 of the hybrid module 13. The rotor unit 15 is mounted via a second rolling bearing on a hollow shaft 22.

The switching unit 1 has a first actuation oil pressure supply duct 8, which is designed such that, for actuating the first clutch 2, it supplies actuation oil such that the first clutch 2 is subjected to actuation oil pressure and is thereby actuated. The switching unit 1 furthermore has a second actuation oil pressure supply duct 9, which supplies actuation oil to the second clutch 3 such that the second clutch 3 is subjected to actuation oil pressure and is thereby actuated. A cooling oil supply duct 10 is also present in the switching unit 1 and introduces cooling oil into the switching unit 1.

The switching unit 1 also has a first cooling oil duct 11, which is connected to the first clutch 2 and is designed to supply cooling oil to the first clutch 2. The switching unit 1 additionally has a second cooling oil duct 1, which is connected to the second clutch 3 and is designed to supply cooling oil to the second clutch 3.

Figure 2:
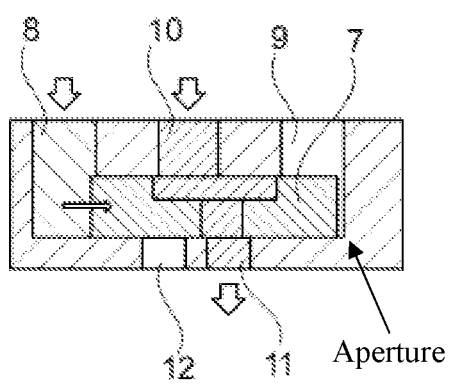
FIG. 2 shows the switching unit in a first switching position.

FIG. 2 shows the switching unit 1 in the first switching position. In the first switching position, the first clutch 2 is subjected to actuation oil pressure such that the first clutch 2 is closed. By way of the actuation oil pressure in the first actuation oil pressure supply duct 8, the slide 7 of the switching unit 1 is moved in the switching unit 1 such that the cooling oil supply duct 10 is connected to the first cooling oil duct 11, with the result that the first clutch 2 can be provided with cooling oil.

Figure 3:
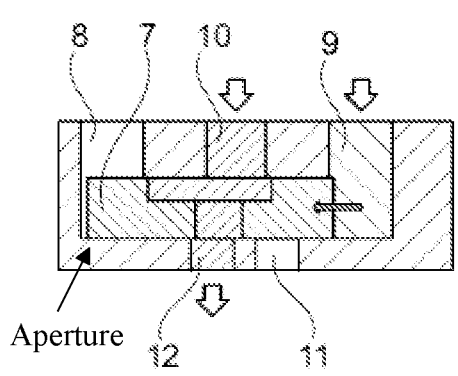
FIG. 3 shows the switching unit in a second switching position.

If the second clutch 3 is subjected to actuation oil pressure, the actuation oil pressure acts on the slide 7 of the switching unit 1 via the second actuation oil pressure supply duct 9 such that said slide is moved such that the cooling oil supply duct 10 is connected to the second cooling oil duct 12, with the result that the second clutch 3 can be provided with cooling oil. In this way, the slide 7 of the switching unit 1 is therefore moved into the second switching position (cf. FIG. 3) and the second clutch 3 is provided with cooling oil. The slide 7 of the switching unit 1 is therefore displaceable only such that the cooling oil supply duct 10 is at all times connected to one of the first and second cooling ducts 11, 12 and separated from the other one of the first and second cooling ducts 11, 12. The slide 7 of the switching unit 1 therefore selectively blocks the supply of cooling oil to the open clutch 2, 3.

Depending on whether the first actuation oil pressure supply duct 8 or the second actuation oil pressure supply duct 9 is subjected to actuation oil pressure, the first cooling oil duct 11 or the second cooling oil duct 12 is connected to the cooling oil supply duct 10. If the clutches 2, 3 are open in the rest state (normally open), then actuation of the first clutch 2 effects a cooling oil supply to the first clutch 2 and actuation of the second clutch 3 effects a cooling oil supply to the second clutch 3. If the clutches 2, 3 are closed in the rest state (normally closed), then actuation of the first clutch 2 effects a cooling oil supply to the second clutch 3 and actuation of the second clutch 3 effects a cooling oil supply to the first clutch 2.

LIST OF REFERENCE SIGNS

1 Switching unit
2 First clutch
3 Second clutch
4 Drive shaft
5 First output shaft
6 Second output shaft
7 Slide
8 First actuation oil pressure supply duct
9 Second actuation oil pressure supply duct
10 Cooling oil supply duct
11 First cooling duct
12 Second cooling duct
13 Hybrid module
14 Torsional vibration damper
15 Rotor unit
16 Spline-type toothing
17 Electric machine
18 Stator
19 Rotor
20 First rolling bearing
21 Housing
22 Hollow shaft

The invention claimed is:

1. A switching unit for supplying cooling oil to first and second clutches,
   the first clutch selectively closable to transmit torque from a drive shaft to a first output shaft;
   the second clutch selectively closable to transmit torque from the drive shaft to a second output shaft;
   which are selectively closable in order to transmit torque from the drive shaft either to the first output shaft or to the second output shaft,
   wherein the switching unit disposed on the output shafts has a slide and fluid ducts which are operatively connected thereto and which are placed in an operative relationship with one another such that the switching unit supplies cooling oil to one of the first and second clutches in a manner dependent on which of the first and second clutches is connected in a torque-transmitting manner to the first output shaft or to the second output shaft;
   the switching unit comprising a plurality of fluid ducts and configured to selectively supply cool oil to the first and second clutches via first and second cooling oil ducts, the switching unit comprising:
   the slide having an aperture extending therethrough, wherein the slide is configured to move between a first position wherein the oil supply duct is fluidly coupled to the first cooling oil duct, and a second position wherein the oil supply duct is fluidly coupled to the second cooling oil duct and further wherein the slide is moved by way of a actuation oil pressure such that the forced displacement of the slide is realized;
   wherein the fluid ducts include a first actuation oil pressure supply duct configured to actuate the first clutch, and a second actuation oil pressure supply duct configured to actuate the second clutch, and wherein the slide is moved based directly upon application of fluid pressure in the first and second actuation oil pressure supply ducts; and
   wherein movement of the slide between the first position and the second position is caused by fluid pressure in the first and second actuation oil pressure supply ducts.

2. The switching unit as claimed in claim 1, wherein the switching unit is designed such that it supplies cooling oil to the clutch which is connected in a torque-transmitting manner to the first output shaft or to the second output shaft.

3. The switching unit as claimed in claim 1, wherein the slide is mounted and controllable such that, in a manner dependent on the supply of hydraulic medium used for the actuation of the respective clutch, the slide is forcibly displaced such that it selectively opens up a supply of cooling oil to the actuated clutch.

4. The switching unit as claimed in claim 3, wherein the switching unit is designed such that the slide is moved by way of a first actuation oil pressure for actuating a first clutch of the two clutches, or by way of a second actuation oil pressure for actuating a second clutch of the two clutches, such that the cooling oil is supplied to the first clutch or to the second clutch.

5. The switching unit as claimed in claim 4, wherein the switching unit has a defined leakage such that a small quantity of cooling oil is conducted to the two clutches in each switching position of the clutches.

6. The switching unit as claimed in claim 4, wherein a duct for delivering the cooling oil is fluidically separated from the first and second actuation oil pressure supply ducts.

7. The switching unit as claimed in claim 4, wherein the slide is displaceable into a first switching position, in which cooling oil is conducted to the first clutch and the second clutch is fluidically separated from a coolant stream.

8. The switching unit as claimed in claim 7, wherein the slide is displaceable into a second switching position, in which cooling oil is conducted to the second clutch and the first clutch is fluidically separated from the coolant stream.

9. A hybrid module for a drivetrain of a motor vehicle, having the two clutches and the switching unit as claimed in claim 1.

10. The hybrid module as claimed in claim 9, wherein the clutches are designed as normally open clutches or as normally closed clutches.

11. A hybrid module for a drivetrain of a hybrid vehicle, the hybrid module comprising:
 a first clutch selectively closable to transmit torque from a drive shaft to a first output shaft;
 a second clutch selectively closable to transmit torque from the drive shaft to a second output shaft;
 a plurality of ducts including a cooling oil supply duct, a first cooling oil duct configured to supply cooling oil to the first clutch, a second cooling oil duct configured to supply cooling oil to the second duct, a first actuation oil pressure supply duct configured to supply actuation oil pressure to the first clutch to actuate the first clutch, and a second actuation oil pressure supply duct configured to supply actuation oil pressure to the second clutch to actuate the second clutch; and
 a switching unit disposed on the output shafts, comprising a plurality of fluid ducts and configured to for selectively supplying cooling to a selected first or second clutch in a manner dependent on which of the first clutch or second clutch is connected in a torque-transmitting manner;
 wherein the supplying cooling oil is distributed to the first and second clutches via the first and second cooling oil ducts, respectively, wherein the switching unit includes a slide having an aperture extending therethrough,
 wherein the slide is configured to move to alternatively fluidly couple
 (i) the cooling oil supply duct with the first cooling oil duct, and
 (ii) the cooling oil supply duct with the second cooling oil duct;
 wherein the slide is configured to move between a first position in which the oil supply duct is fluidly coupled to the first cooling oil duct, and a second position in which the oil supply duct is fluidly coupled to the second cooling oil duct, wherein movement between the first position and the second position is directly caused by fluid pressure in the first and second actuation oil pressure supply ducts.

12. The hybrid module of claim 11, wherein actuation oil pressure in the first actuation oil pressure supply duct causes the slide to move to the first position such that the first clutch is supplied with cooling oil when the first clutch is actuated.

13. The hybrid module of claim 12, wherein the slide is configured to move to the second position in response to actuation oil pressure in the second actuation oil pressure supply duct such that the second clutch is supplied with cooling oil when the second clutch is actuated.

14. The hybrid module of claim 11, wherein the switching unit has a defined leakage such that a small quantity of cooling oil is supplied to both of the clutches when the slide is in the first position and the second position.

15. The hybrid module of claim 11, wherein the first actuation oil pressure supply duct is pressurized when the first clutch is actuated, and wherein the first actuation oil pressure supply duct being pressurized provides pressure on the slide to move the slide to the first position.

\* \* \* \* \*